United States Patent [19]

Ramakrishnan et al.

[11] Patent Number: 5,634,346

[45] Date of Patent: Jun. 3, 1997

[54] APPARATUS AND METHOD FOR CONTROLLING A ROOM AIR CONDITIONER

[75] Inventors: Rengaswamy Ramakrishnan; Eric H. Albrecht, both of San Antonio, Tex.

[73] Assignee: U.S. Natural Resources, Inc., San Antonio, Tex.

[21] Appl. No.: 538,368

[22] Filed: Oct. 3, 1995

[51] Int. Cl.$^6$ ............................................. F25D 17/00
[52] U.S. Cl. .............................. 62/89; 62/179; 62/231
[58] Field of Search .......................... 62/179, 181, 89, 62/231; 236/49.3, 78

[56] References Cited

U.S. PATENT DOCUMENTS

| | | | |
|---|---|---|---|
| 4,142,374 | 3/1979 | Ansted et al. | 62/155 |
| 4,144,930 | 3/1979 | Ferdelman | 62/231 X |
| 4,176,525 | 12/1979 | Tucker et al. | 62/238 R |
| 5,255,530 | 10/1993 | Janke | 62/186 X |

FOREIGN PATENT DOCUMENTS

| | | | |
|---|---|---|---|
| 0065532 | 4/1982 | Japan | 62/179 |

Primary Examiner—William E. Wayner
Attorney, Agent, or Firm—Gunn, Lee & Miller, PC

[57] ABSTRACT

An electronic controller for a room air conditioner includes a memory for storing operational parameters, a thermistor for measuring ambient temperature, and a microprocessor capable of calculating the difference between the ambient temperature and the temperature set point, and capable of controlling the speed of the fan and fan motor based on the difference between the ambient temperature and the temperature set point. The controller includes an electronic system clock, an electronic control panel with a display, the ability to store in memory a start time for normal operation of the room air conditioner and a stop time for ending normal operation of the room air conditioner, and a timer mode activation device. The controller is also able to detect and store the cumulative length of time that the fan blower has operated, to compare the stored length of time to a predetermined length of time, to indicate when the stored length of time is equal to or greater than the predetermined length of time, and to reset the stored length of time to zero.

16 Claims, 6 Drawing Sheets

APPARATUS AND METHOD FOR CONTROLLING A ROOM AIR CONDITIONER

BACKGROUND OF THE INVENTION

1. Field of the Invention

An electronic room air conditioner controller which interfaces with a room air conditioner and controls its operation. A method of controlling a variable speed fan within the air conditioner is also disclosed. The controller has a memory and timer function, controls fan operation independent of compressor operation, and signals the user when the air filter should be changed.

2. Description of the Related Art

It is advantageous, in room air conditioners, to provide an electronic controller and thermostat which decreases the amount of frequent user involvement necessary in operating the room air conditioner and which helps the room air conditioner to function efficiently.

Prior art room air conditioners are manually controlled and operated by the user. For example, when the user wants to turn the room air conditioner on, he typically has to manually operate a switch somewhere on a control unit normally located on the room air conditioner itself. This same process is necessary when the user desires to turn the air conditioner off. This procedure is also necessary when changing any other operating parameter of the room air conditioner such as the fan speed and the desired temperature. Furthermore, the prior art room air conditioners and their controllers provide little or no information to the user regarding maintenance of the room air conditioner. They are also typically controlled in an "on" or "off" fashion, with no capability to select a mode in which the air conditioner controls its own operation.

SUMMARY OF THE INVENTION

None of the prior art room air conditioner controllers provide for an electronic controller having a number of applicants' unique features, directed to minimize or completely eliminate the need for repeated user involvement in operating the room air conditioner. These features include a low voltage lock-out which will allow normal unit operation only when the input voltage is above a preset minimum threshold; mode control which allows the selection of the operating modes of the unit; remote control operation of the controller; timed compressor lock-out protection; automatic regulation of fan speed; a timer feature for air conditioner start and stop times; an indicator which flashes after the fan has operated for a fixed number of hours to alert the user that the filter needs to be changed; and a control touch pad for user interaction with the controller. The controller further includes means by which temperature can be displayed and set in either degrees Fahrenheit or Celsius, as well as frost protection for the evaporator coil. The controller also includes non-volatile memory which saves the latest operation settings in case power to the controller is lost.

Other features of applicants' room air conditioner controller include operation in the COOL mode in which the fan runs continuously and the controller turns the compressor on and off as necessary to keep the indoor temperature at a preset level; the MONEY SAVER® mode in which the controller cycles the fan on and off with the compressor as necessary to keep the indoor temperature at a preset level; and FAN ONLY mode in which the compressor does not operate at all and the fan runs continuously at a user selected speed.

Applicants' controller is mounted on the front of the room air conditioner unit for easy access by the user. In addition, as previously mentioned, the controller may be operated by a remote control having all the functions that the controller has. Applicants' unique room air conditioner controller helps to minimize the need for repeated user interaction with the room air conditioner and yet still fulfills the user's cooling needs. The controller is simple to use and can help reduce operating cost by avoiding unnecessary operation through the use of the timer control. The thermistor temperature control keeps room temperature variation to a minimum.

In fulfillment of the above objectives, the present invention provides for an electronic controller for a room air conditioner having a compressor, an electric motor, a fan, a blower, an evaporator, and a condenser. The electronic controller includes a memory for storing operational parameters, a thermistor for measuring ambient temperature, and a microprocessor capable of calculating the difference between the ambient temperature and a temperature set point for the purpose of controlling compressor operation, fan motor operation and the speed of the fan based on the difference between the ambient temperature and the temperature set point. The controller also includes an electronic system clock, and an electronic control panel with a display that allows the user to program the controller to automatically start and stop operation of the room air conditioner based on pre-selected times. The controller can also detect and store the cumulative length of time that the fan/blower has operated and then signal when the air conditioner filter should be changed based on a preset number of hours of unit operation.

DESCRIPTION OF THE PREFERRED EMBODIMENT

Figure 1:
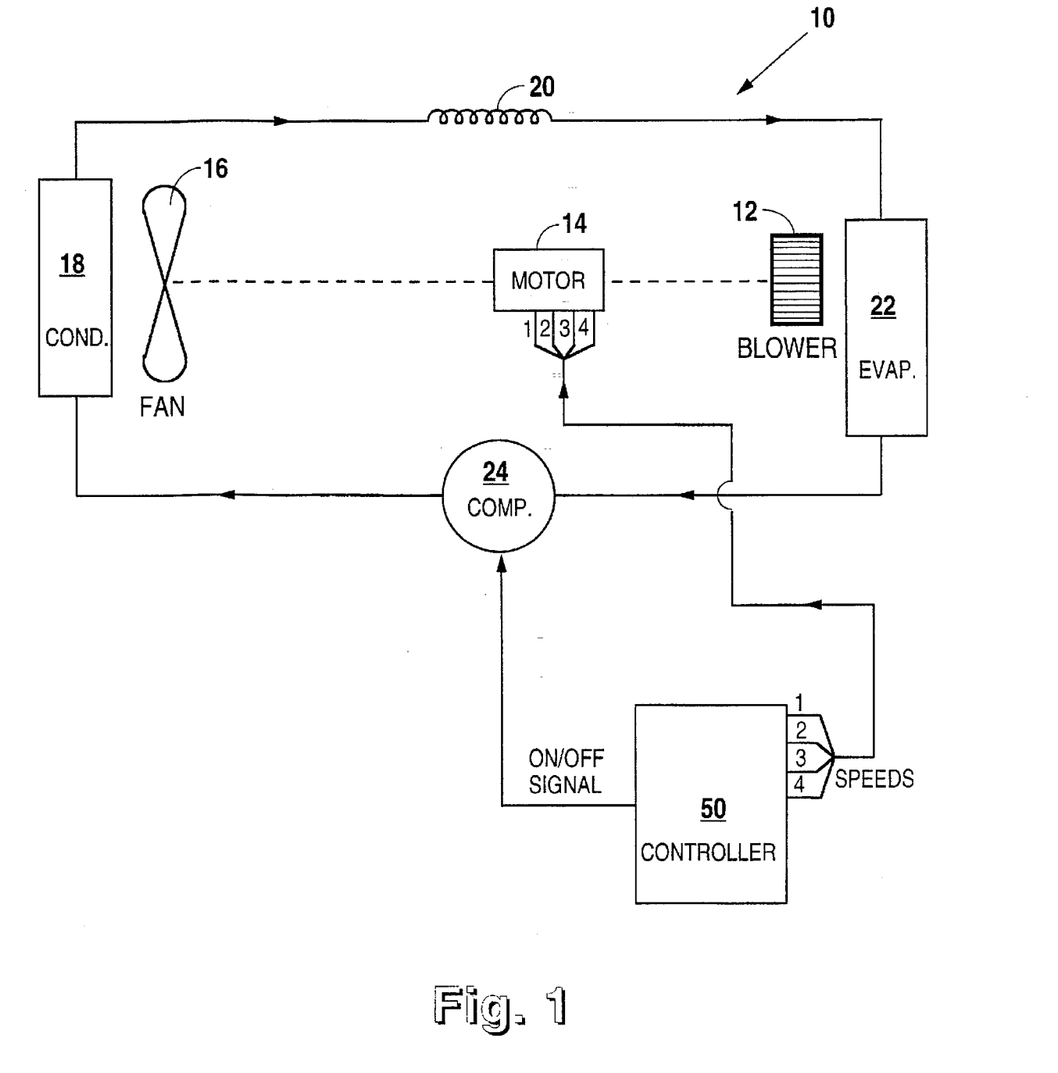
FIG. 1 is a schematic block diagram of a preferred embodiment of the present invention showing the components of a room air conditioner and their connections to the electronic controller.

Referring now to FIG. 1, a general block diagram schematic for a room air conditioner (10) containing an electronic controller (50) is shown. Generally, the room air conditioner is composed of several components, most of which are well known in the art. A blower (12) is connected to a motor (14) which drives the blower (12). The motor (14) is capable of operating at a number of different speeds based on a fan speed signal received from the controller (50). The motor (14) is also connected to and drives a fan (16). The speed of the fan (16) is determined by the fan speed signal received by the motor (14). The fan (16) is positioned adjacent a condenser (18) which condenses high pressure refrigerant circulating within the air conditioner (10) thereby extracting heat from the refrigerant. This fan (16) blows outside air across the condenser (18) to cool it and force the heated air to the outside. The refrigerant flows from the condenser (18) through a capillary tube (20) to an evaporator (22) positioned in front of the blower (12). The evaporator (22) evaporates the low pressure refrigerant thereby lowering the temperature of the air blowing across it. The blower (12) then blows this cooler air into the room to be air conditioned. The evaporated refrigerant then flows from the evaporator (22) to a compressor (24) which compresses it and passes it on to the condenser (18) where the heat is extracted from it, and the cycle repeats again. The controller (50) of the present invention is connected to the compressor (24) and switches it on and off as necessary through a compressor signal, along with the fan motor (14).

Figure 2:
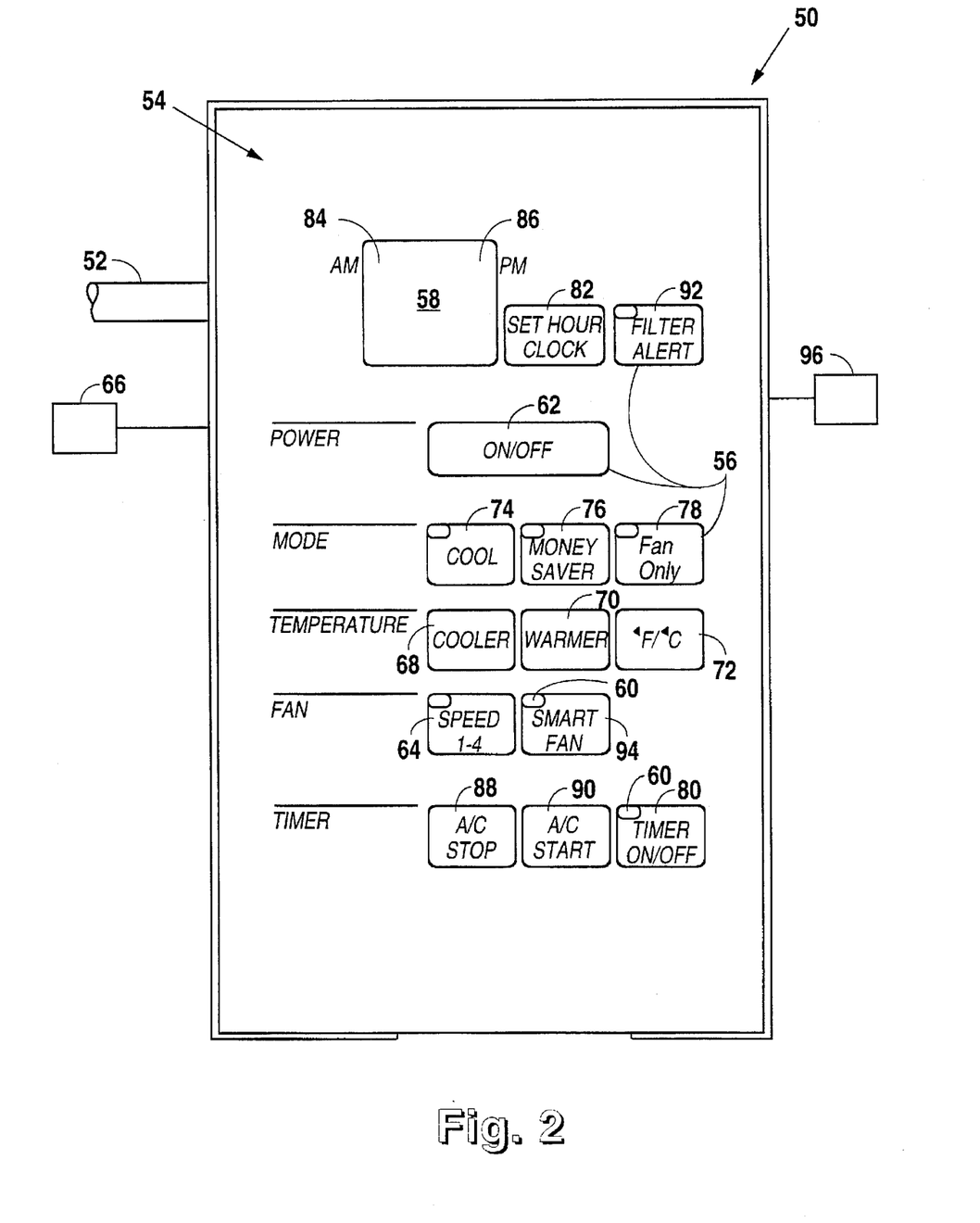
FIG. 2 is an elevation view of a preferred embodiment of the face plate (fascia overlay) of the electronic controller of the present invention.

Reference is now made to FIG. 2 for a detailed description of the electronic controller of the present invention. FIG. 2 shows the front face of a first embodiment of the electronic controller (50) of the present invention. The electronic controller (50) is used to control various aspects and functions of the room air conditioner. Power to the electronic controller (50) is supplied through a power supply cord (not shown) connecting the unit to a main power supply. A wiring harness (52) bundles together a number of wires leading from the electronic controller (50) to the motor and compressor as described above. It is through these conductors in the wiring harness (52) that the electronic controller (50) is able to control the operation of the various air conditioner components.

In the preferred embodiment, the flat, visible face (54) of the electronic controller (50) contains switch pads (56), an LED display (58), and LED indicators (60), all overlaid by a scratch resistant film, typically made of a polycarbonate material. The switch pads (56) are activated by manually depressing the pad (56) and may function in a number of ways. To avoid any false signals to the controller, the user relays a positive signal by applying adequate pressure to the switch pads (56) for a brief, yet sufficient, period of time. The preferred embodiment employs the switch pads (56) which function in one of three ways. First, the switch pad (56) may simply toggle between two possible settings. The power on/off switch pad (62) is an example of this functional use of the switch pad (56). Second, the switch pad (56) may be used to cycle through a limited number of options. An example of this is illustrated by the fan speed switch pad (64) which advances to the next higher fan speed each time it is depressed. The fan speed returns to the lowest speed setting when the pad is depressed while the fan speed is running at the highest speed setting. Third, the switch pad (56) may be used to set a particular operating parameter, such as when setting the current time or desired temperature. The specific details of each of the switch pads (56) on the controller (50) are further described hereinbelow.

The LED display (58) is used to relay various information regarding device operation and settings to the air conditioner user. For example, the LED display (58) may show the current clock time, the temperature setting, the fan speed, or even an error code. A separate LED indicator shows AM or PM (84, 86). The LED display (58) flashes when powered for the first time or when there has been a power interruption. The LED indicators (60) are also used to relay information regarding operation of the device to the user.

Also connected to the electronic controller (50) is a device (66) capable of measuring ambient air temperature and relaying that information to the electronic controller (50). In the preferred embodiment, this is accomplished through a thermistor connected to the electronic controller (50) by way of insulated wire. The controller (50) is then able to compare the ambient air temperature to a desired or "set point" temperature preset by the user. The electronic controller (50) then adjustably controls the speed of the fan based on the difference between the two temperatures and whether the ambient air temperature is falling or rising as further described below as the SMART FAN mode. Alternately, the user can pre-select a constant fan speed with the "Speed 1-4" switch pad (64).

In the preferred embodiment, when the air conditioning unit and electronic controller (50) are first connected to a power supply, the LED display (58) will flash. The user can then press any pad to turn the controller (50) off. The user must then depress the on/off switch pad (62) to turn the unit on. The controller (50) will then operate with default settings. The LED display (58) will show an initial 75° Fahrenheit temperature set point, and the unit will automatically be in COOL mode with the fan speed set at the lowest speed. In order to adjust the temperature, the user repeatedly depresses the "Cooler" switch pad (68) or the "Warmer" switch pad (70) until the desired temperature setting is shown in the LED display (58). The user may also toggle between Fahrenheit and Celsius temperature display by depressing the "°F./°C." switch pad (72).

The electronic controller (50) also functions to set the mode of operation for the air conditioner. In the preferred embodiment, there are four different modes of operation: COOL, MONEY SAVER®, FAN ONLY, and TIMER modes. Any one of these modes is activated by depressing the appropriate switch pads (56) on the electronic controller (50). Independent of these four modes of operation is the SMART FAN feature activated by the SMART FAN switch pad (94) by which the controller (50) regulates the fan speed as described below.

In the preferred embodiment, the air conditioning unit will be in the COOL mode with constant fan speed when first powered on. This is indicated by the illumination of the LED indicator (60) on the "Cool" switch pad (74). In the COOL mode of operation, the electronic controller (50) will cycle the air conditioning compressor on and off as needed to maintain the ambient air temperature within a reasonable margin of the temperature set point. In the preferred embodiment, the reasonable margin is within 1.5° F. above or below the temperature set point. The fan will always run when the air conditioner is operating in this mode.

The second mode of operation is the MONEY SAVER® mode. This mode of operation will be indicated by illumination of the LED indicator (60) on the "Money Saver" switch pad (76). When operating in this mode, the electronic controller (50) will only cycle the fan on whenever it cycles the compressor on as needed to maintain the ambient air temperature. In the preferred embodiment, the compressor will be turned off when the ambient temperature falls below the temperature set point typically by 1.5° F. and turned on when the ambient temperature rises above the temperature set point typically by 1.5° F. In order to reduce inrush current, the fan cycles on five seconds before the compressor does and cycles off five seconds after the compressor turns off. In this mode, the fan does not operate all the time, so this mode has the advantage of saving energy and improving dehumidification. To return to constant fan operation, the user simply depresses the "Money Saver" switch pad (76) again.

The third mode of operation is the FAN ONLY mode. This mode is activated by depressing the "Fan Only" switch pad (78) and is indicated by illumination of the LED indicator on the "Fan Only" switch pad (78). In the FAN ONLY mode of operation, only the air conditioner blower and fan, and not the air conditioner compressor, will operate. This mode may be used in conjunction with the fresh air/exhaust lever (not shown) on the air conditioning unit to bring outside air into a room, or to exhaust stale air.

The fourth mode of operation is the TIMER mode. The user is signaled when the unit is in the TIMER mode by illumination of the LED indicator (60) on the "Timer On/Off" switch pad (80). In order for the TIMER mode to function properly, the user must first input the current time into the electronic controller. In the preferred embodiment, this is accomplished by depressing the "Set Hour Clock" switch pad (82) to show the current hour clock setting on the LED display (58). In order to change the current hour clock setting, the user must depress and hold the "Set Hour Clock" switch pad (82) until the actual time appears in the display, making sure that the proper A.M. or P.M. indicator (84, 86) is illuminated. In the preferred embodiment, only hours and not minutes will show on the display (58), with the user setting the time to the nearest hour.

Once the current time has been set, the TIMER start and stop times must be set. The TIMER on and off times may only be a minimum of one hour apart and a maximum of twenty-three hours apart. In order to set the TIMER stop time, the "A/C Stop" switch pad (88) must be depressed and held until the correct hour for unit shut-off appears in the LED display (58). Again, proper attention must be paid to the A.M. and P.M. indicators (84, 86). Similarly, to program the start time for unit activation, the "A/C Start" switch pad (90) must be depressed and held until the desired hour for unit activation appears in the LED display (58). Once the start and stop times have been programmed into the unit, the TIMER mode is activated by depressing the "Timer On/Off" switch pad (80) such that the LED indicator thereon is illuminated.

The electronic controller (50) contains within its circuitry an internal electronic system clock capable of tracking real time, and capable of being set by the user of the air conditioner. The controller (50) also has electronic memory for storing the start and stop times. Once the TIMER mode is activated, the electronic controller (50) will repeatedly activate the air conditioner at the designated start time and will de-activate the air conditioner at the designated stop time once every twenty-four hour period as long as the unit is operated in TIMER mode.

In the preferred embodiment of the present invention, the electronic controller (50) will also alert the user that the air filter (not shown) should be replaced once the air conditioner blower has operated more than a specified number of hours. The typical value is 250 hours. This feature is referred to as Filter Alert. The user will be notified of the Filter Alert condition through illumination of the LED indicator (60) on the "Filter Alert" switch pad (92). The electronic controller (50) is able to detect whenever the air conditioner blower is in operation and keeps track of the cumulative length of time that the blower has operated. This cumulative length of time is kept in memory, and is repeatedly compared to the hour limit. Once the hour limit has been exceeded by the cumulative length of blower operation time, the electronic controller (50) repeatedly illuminates the LED indicator (60) on the "Filter Alert" switch pad (92). The user may reset the LED indicator (60) by depressing the "Filter Alert" switch pad (92). This will cause the LED indicator light to be extinguished, and the cumulative length of blower operation time to be reset to zero in memory.

Figure 3:
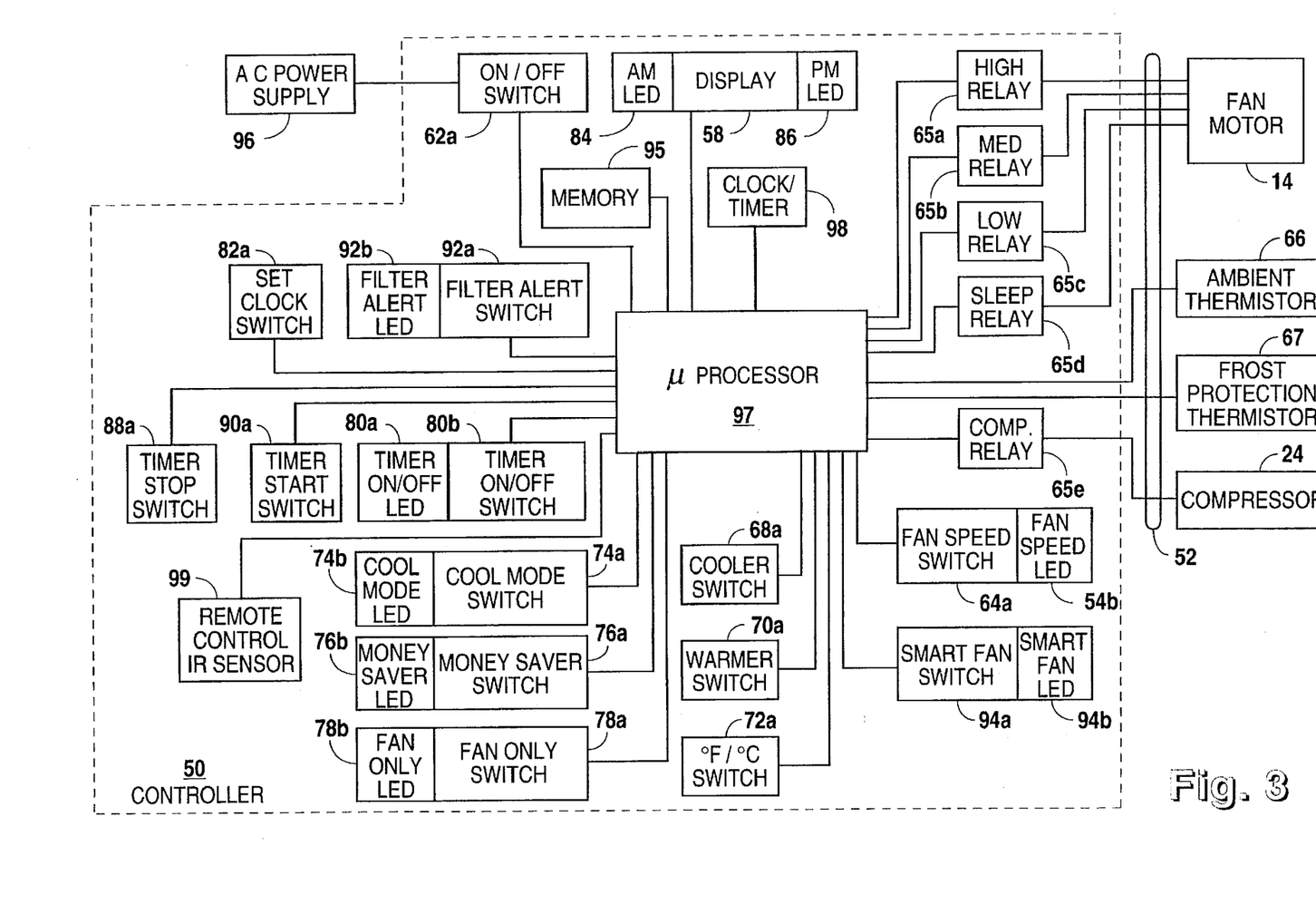
FIG. 3 is a schematic block diagram of the electronic controller of the present invention.

FIG. 3 is a schematic block diagram of the air conditioner electronic controller (50) of the present invention, wherein like elements are similarly numbered as in FIG. 2. The heart of the controller (50) is the microprocessor (97). The microprocessor (97) has associated with it a clock/timer (98) capable of tracking real time. The microprocessor (97) also drives the display (58) on the front of the controller (50). The microprocessor (97) is connected to and controls the other components of the air conditioner such as the fan motor (14), the ambient thermistor (66), the frost protection thermistor (67), and the compressor (24), through a wiring harness (52). It is through the harness (52) that the controller (50) is physically and electrically connected to the various air conditioner components. The controller (50) is also connected to an AC power supply (96) which may be the same power supply used to power the room air conditioner or may be a conditioned version of that power supply. The clock/timer (98) is used both as an internal digital timing clock and as a clock to measure real time. Further, the microprocessor is connected to a non-volatile memory (95) for storage of default settings and current operating parameters. The non-volatile nature of the controller memory (95) allows the controller (50) to retain the user-set operating parameters in case of a power failure.

The microprocessor (97) also has direct connections to the various switch pads located on the face of the controller (50) used to control the air conditioner's operation. The microprocessor (97) detects when the state of any of these switches changes, and the microprocessor (97) adjusts the operation of the air conditioner components accordingly. The main switch is the on/off switch (62a) which turns the entire controller/room air conditioner on and off. Two switch pads on the face of the controller control the fan motor (14): the fan speed switch (64a) and the SMART FAN switch (94a). Each of these switches also has associated with it an LED (64b, 94b) to indicate the current mode of fan operation. When the air conditioner operator desires a fixed fan speed, the speed is selected by pressing the fan speed switch (64a) until the desired fan speed is selected. The preferred embodiment contains four such fan speeds. Located between the microprocessor (97) and the fan motor (14) are the fan relays (65a–65d). The microprocessor controls the fan motor (14) by activating the appropriate fan relay for the desired fan speed: the high relay (65a) controls the highest fan speed; the medium relay (65b) controls the medium fan speed; the low relay (65c) controls the low fan speed; and the sleep relay (65d) controls the lowest fan speed. Each fan relay serves as a switch to open or close the circuit to the fan motor (14) for that fan speed. The fan relays (65a–65d) are all normally-open relays. In the preferred embodiment, the fan relays (65a–65d) are capable of switching a ¼ horsepower motor.

The selected fan speed switch information is transferred to the microprocessor (97) which signals the proper fan relay (65a–65d) to cycle on after an appropriate delay period. This fan delay period occurs whenever there is a change in the fan motor speed and helps prevent shorting of the fan motor. If the air conditioner user wants the controller (50) to regulate the fan speed based on a difference between the ambient temperature and the temperature set point, as previously described herein, the user indicates this by depressing the SMART FAN switch (94a). At that time, the SMART FAN LED (94b) will illuminate indicating its selection. When the microprocessor (97) senses that the SMART FAN mode has been entered, it takes over control of the fan speed as previously described.

The air conditioner operator sets the desired temperature set point for unit operation by repeatedly depressing the COOLER switch (68a) until the desired temperature set point is indicated in the display (58). If the operator wants a warmer temperature, this is accomplished by depressing the WARMER switch (70a) on the face of the controller (50). The user may also toggle between temperature display in Fahrenheit or Celsius by depressing the °F./°C. switch (72a). As the changes to the temperature set point are made through the temperature switch pads (68a, 70a), the microprocessor (97) stores the desired temperature set point in memory (95). This temperature set point is then compared to the ambient temperature relayed to the microprocessor (97) through the ambient thermistor (66) for proper control of the air conditioner unit. When cooling is required, the microprocessor (97) activates the compressor (24) through a compressor relay (65e). The compressor relay (65e) is similar to the fan relays (65a–65d) described above. It is a normally-open relay that closes the circuit to the compressor (24) when activated by the microprocessor (97) due to a demand for cooling.

As previously mentioned, the air conditioner unit has several modes of operation. Exactly which mode of operation is currently in use is selected by depressing the COOL mode switch (74a), MONEY SAVER® switch (76a), or FAN ONLY switch (78a) on the face of the controller (50). As the microprocessor (97) senses a change in the selection of the operation mode of the unit, it correspondingly illuminates the appropriate LED (74b, 76b, 78b) to indicate which mode has been selected. The operator of the unit may also set the correct hour for the real time clock by depressing the SET HOUR CLOCK switch (82a). As the user makes changes in the real time clock, the hour is shown on the display (58) along with the appropriate A.M. LED (84) or P.M. LED (86) indications. When the microprocessor (97) senses a change in the SET HOUR CLOCK switch (82a), it updates the real time clock (98) accordingly.

To implement the timer function of the air conditioner controller (50), the user must set the timer start and stop times. The timer stop time is set by pressing and holding the air conditioner timer stop switch (88a) until the desired stop time is shown on the display (58). Similarly, to set the desired timer start time, the air conditioner timer start switch (90a) is pressed and held until the desired start time is shown in the display (58). To then activate the timer itself, the TIMER ON/OFF switch (80a) is pressed. If the timer on/off LED (80b) is on, the timer has been activated. The TIMER ON/OFF switch (80a) is pressed again to turn the timer mode of operation off.

The microprocessor (97) also keeps track of the cumulative number of hours that the fan motor has run. Once a certain threshold number of hours has been reached, the filter alert LED (92b) will flash on the filter alert switch (92a) to alert the user that the air conditioner filter should be changed. In the preferred embodiment, this upper time limit for fan motor operation is set at 250 hours. In order to reset the number of hours of fan operation being tracked by the microprocessor (97), the filter alert switch (92a) must be pressed.

The controller (50) of the present invention also comes equipped with an infrared sensor (99) connected to the microprocessor (97) for remote operation of the controller (50). The air conditioner unit user is able to employ a remote controlled device (not shown) which has the same control switches as the controller (50) to remotely operate the air conditioner unit. The microprocessor (97) receives signals from the remote control through the infrared sensor (99) for air conditioner unit control and operation. These signals are then processed by the microprocessor (97) as previously described herein.

Figure 4:
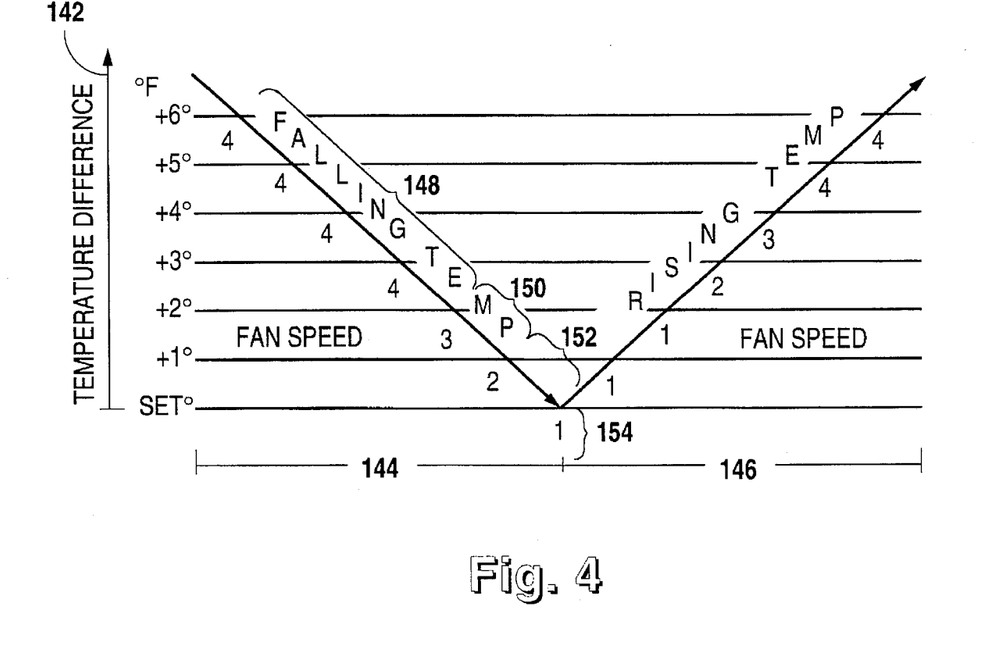
FIG. 4 is a graphical representation of the operating fan speeds for various incremental ranges of temperature difference between the ambient air temperature and the temperature set point.

With reference now to FIG. 4, a more detailed description of how the microprocessor regulates the fan speed when the unit is operated in the SMART FAN mode is described. FIG. 4 is a graphical representation of the microprocessor logic which controls the fan motor speed when the unit is operated in the SMART FAN mode. The vertical axis (142) represents a temperature difference in degrees Fahrenheit. The difference is calculated by the microprocessor by subtracting the temperature set point entered by the user and stored in memory from the ambient room temperature relayed to the microprocessor by the ambient thermistor. The resulting temperature difference is one of the factors used by the microprocessor in determining the proper fan speed. The other factor used by the microprocessor is whether the ambient temperature is decreasing or increasing. The decreasing or falling temperature range (144) is shown on the left half of FIG. 4. The rising or increasing temperature range (146) is shown on the right half of FIG. 4. Various subranges exist within these two ranges. For example, within the falling temperature range (144), if the microprocessor detects a temperature difference greater than 2° F., it will set the fan speed at speed 4 by activating the high fan relay. This is shown in subrange (148). Subrange (150) indicates that fan speed 3 (medium fan relay) will be used when the temperature difference is between 1° F. and 2° F. Subrange (152) shows a fan speed of 2 (low fan relay) being used for a temperature difference between 0° F. and 1° F. Fan speed 1 (sleep fan relay) is used whenever the ambient temperature is below the set temperature as indicated by subrange (154).

The rising temperature range (146) shows the corresponding fan speeds used for various subranges when the ambient temperature is increasing. The microprocessor determines whether the temperature is falling or rising by periodically reading the ambient temperature from the ambient thermistor and storing this temperature in memory. The previously stored ambient temperature can then be used to compare a new ambient temperature reading and thus determine whether the ambient temperature is falling or rising.

Figure 5A:
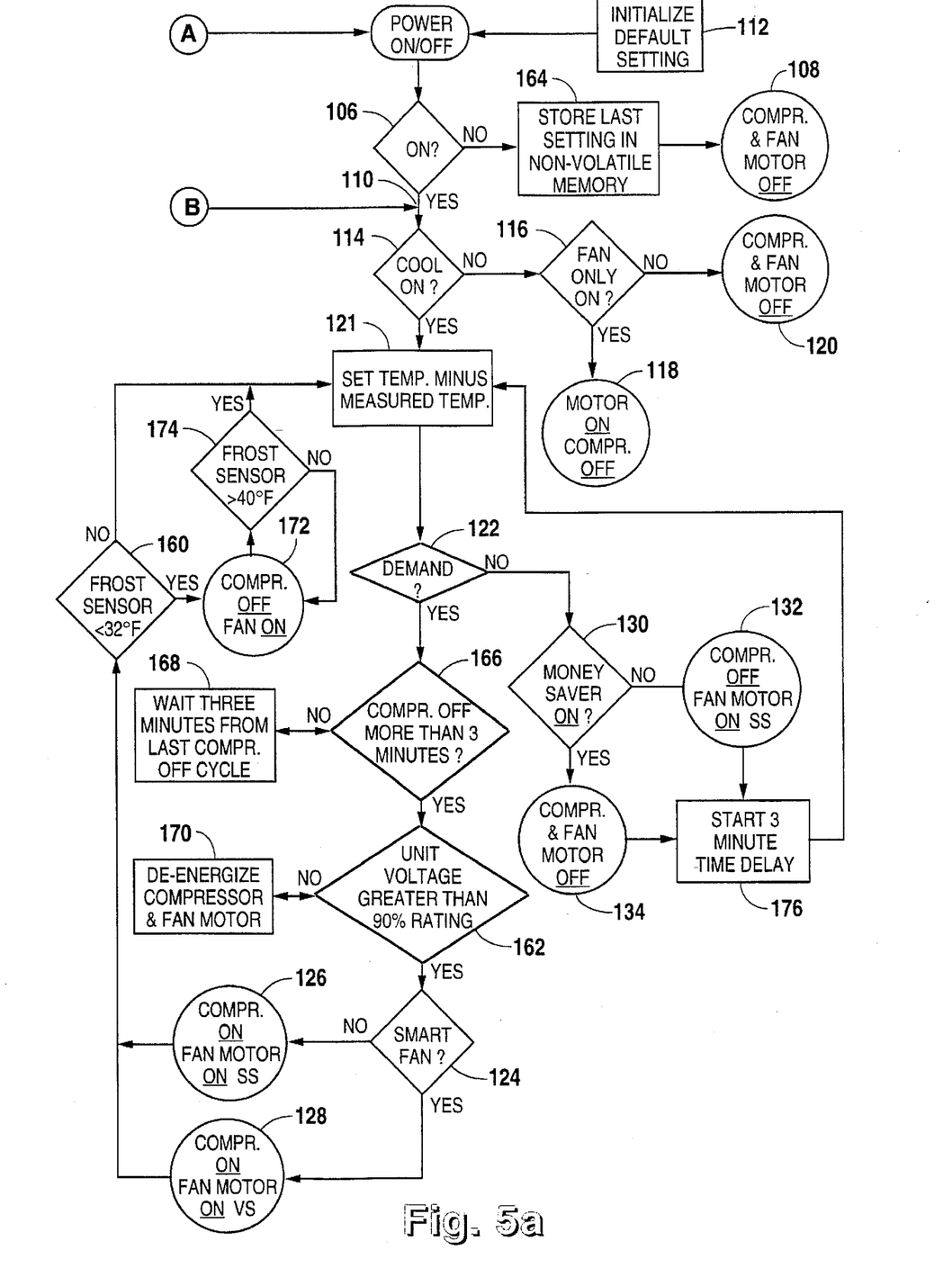
FIG. 5A is a flow chart diagram of the logic steps performed by the controller.
Figure 5B:
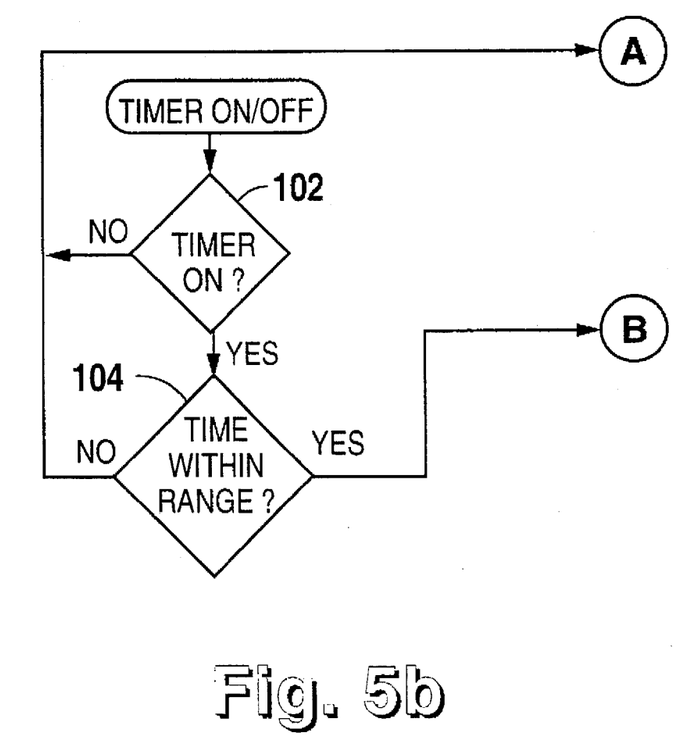
FIG. 5B is a continuation of the flow chart shown in FIG. 5A.

With reference now to FIGS. 5A and 5B, a logic diagram for the operation of the electronic controller (50) of the present invention is detailed. In the preferred embodiment, this logic is implemented by the microprocessor. As shown in FIG. 5B, the controller logic first checks to see if the TIMER mode is currently activated (102). If the controller is operating in TIMER mode, the controller logic checks to see whether the current real time as measured by the microprocessor clock (not shown) falls between the pre-set start time and the stop time (104). If so, then the controller checks for the current mode of operation as described below. If, on the other hand, the TIMER mode is not activated, or the TIMER mode is activated but the current time falls outside the start and stop time, then the controller logic will determine the state of the power on/off switch (106). If the power is off, then the controller will store the last unit operating parameters set by the user in non-volatile memory (164). The controller will also signal that the compressor and fan motor are off (108).

If the power is on, or if the TIMER mode is activated and the current time falls between the start and stop time (110), then the controller checks for the current mode of operation. If the unit was just installed and the power just turned on, the controller initializes the unit for operation with default settings (112). The default settings operate the unit in COOL mode with the temperature set at 75° F. and the fan speed at the lowest speed setting. If the user has programmed the unit before, the last operating settings are recalled from memory and used to initialize the unit when the power first comes on.

The controller logic next checks to see if the unit is operating in COOL mode (114). If it is not in COOL mode, the controller checks to see whether the unit is operating in FAN ONLY mode (116). If in FAN ONLY mode, the controller sets the fan motor on at the current fan motor speed setting and sets the compressor off (118). If not in COOL mode and not in FAN ONLY mode, the controller sets both the fan motor and the compressor off (120).

If the controller reads that the COOL mode is the current mode of operation, it maintains the ambient room temperature within a certain range of the temperature set point. It accomplishes this by repeatedly comparing the measured ambient temperature from the ambient thermistor to the temperature set point stored in memory (121). If the measured temperature is greater than the set temperature by more than a marginal amount (the marginal amount may be different for COOL mode and MONEY SAVER® mode), then a demand condition is created. If not, then there is no current demand for cooling.

The controller periodically checks for a demand condition for cooling (122). If a demand exists, then the controller first checks that the compressor has been off more than three minutes (166). This three-minute compressor time delay prevents the compressor from short-cycling. If there is a demand for the compressor to be on and at least three minutes have not elapsed since the last time the compressor turned off, then the controller waits the full three minutes since the last compressor off cycle (168). If the compressor has been off more than three minutes, the controller checks that the voltage to the unit is within ten percent of the unit rated voltage (162). If the voltage to the unit has fallen more than ten percent, then the controller de-energizes the compressor and fan motor (170). The controller prevents operation of the compressor and fan motor until the voltage is restored to within ten percent of the rating.

If there is a demand for cooling, the compressor has been off at least three minutes, and the voltage to the unit has not fallen below ninety percent of the unit rated voltage, the controller next checks for the SMART FAN mode (124). If the unit is not in SMART FAN mode, the controller signals the compressor to turn on and the fan motor to operate at a speed selected by the user (126). If there is a demand for cooling and the SMART FAN mode is active, then the controller turns the compressor on and regulates the fan motor speed based on the difference between the ambient temperature and the temperature set point and whether the ambient temperature is rising or falling as previously described hereinabove (128). Once there is a demand for cooling and the compressor is turned on, the controller verifies the temperature of the evaporator coil in the air conditioner has not fallen below 32° F. (160). It senses the evaporator coil temperature through its connection to the frost protection thermistor which is embedded in the evaporator coil. If the evaporator coil temperature has fallen below 32° F., then the controller turns the compressor off but leaves the fan running (172). The controller keeps the compressor off and the fan running until the temperature in the evaporator coil reaches a pre-set temperature (40° F. in the preferred embodiment) (174). The controller then repeats the cycle by calculating the difference between the set temperature and the ambient temperature (121).

If there is no demand for cooling (122), the controller checks whether the MONEY SAVER® feature is active (130). If it is not, then the controller turns the compressor off and operates the fan motor speed at the speed selected by the user (132). If the MONEY SAVER® mode is active and there is no demand, the controller turns both the compressor and the fan motor off (134). Once the compressor is turned off, the controller begins to track the three-minute time delay for the compressor (176) as described above.

Terms such as "left," "right," "up," "down," "bottom," "top," "front," "back," "in," "out," and the like are applicable to the embodiments shown and described in conjunction with the drawings. These terms are merely for purposes of description and do not necessarily apply to the position or manner in which the invention may be constructed for use.

Although the invention has been described in connection with the preferred embodiment, it is not intended to limit the invention's particular form set forth, but on the contrary, it is intended to cover such alternatives, modifications, and equivalences that may be included in the spirit and scope of the invention as defined by the appended claims.

We claim:

1. A room air conditioner having a compressor, an electric motor, a fan, a blower, an evaporator, a condenser and a controller, the controller comprising:

means for setting a desired temperature at a temperature set point;

means for measuring ambient temperature, including means for measuring changes in said ambient temperature;

means for calculating the temperature difference between said ambient temperature and said temperature set point;

means for controlling the speed of said motor, fan and blower at any one of a plurality of fan speeds based on said temperature difference, each of said fan speeds being associated with a predetermined range of increasing or decreasing values of said temperature difference; and means for controlling the operation of said compressor based on said temperature difference.

2. The room air conditioner of claim 1, said controller further comprising:

an electronic system clock;

an electronic control panel having a display mounted integral with said room air conditioner;

timer means for setting a start time at which normal operation of said room air conditioner begins and a stop time at which normal operation of said room air conditioner ends;

means for activating and deactivating said timer means.

3. The room air conditioner of claim 16, wherein said electronic control panel is connected to said timer means and includes a touch pad for entering said start time and an adjacent touch pad for entering said stop time.

4. The room air conditioner of claim 2, wherein said means for activating and deactivating said timer means is a touch pad toggle switch.

5. The room air conditioner of claim 2, wherein said start time and said stop time are between one and twenty-three hours apart.

6. The room air conditioner of claim 2, wherein said start time and said stop time are repeated every twenty-four hours allowing the room air conditioner to be activated and deactivated in a continuous twenty-four hour cycle.

7. The room air conditioner of claim 1, said controller further comprising:

means for detecting and storing a cumulative length of time said blower has operated since a last reset;

means for comparing said cumulative length of time since said last reset to a predetermined length of time;

means for indicating when said cumulative length of time is equal to or greater than said predetermined length of time; and means for resetting to zero said cumulative length of time.

8. The room air conditioner of claim 7, wherein said indicating means is a visual alarm.

9. The room air conditioner of claim 7, wherein said means for resetting to zero said cumulative length of time is a filter alert touch pad.

10. The room air conditioner of claim 7, wherein said predetermined length of time is from 200 to 300 hours.

11. The room air conditioner of claim 7, wherein said predetermined length of time is 250 hours.

12. A method for controlling the operation of a room air conditioner unit having a compressor, an electric fan motor, a fan, a blower, an evaporator, a condenser, and a power supply comprising the steps of:

detecting whether a TIMER mode of operation has been selected;

detecting whether the unit power is on;

detecting whether a COOL mode of operation has been selected;

detecting whether a FAN ONLY mode of operation has been selected;

setting a desired temperature at a temperature set point;

measuring current ambient room temperature;

storing said ambient room temperature in memory;

calculating the temperature difference between said ambient room temperature and said temperature set point;

storing user-programmed operating parameters for said unit in non-volatile memory;

indicating a demand for cooling based on said temperature difference;

verifying the temperature of said evaporator;

detecting whether a MONEY SAVER® mode of operation has been selected;

measuring the voltage of said power supply applied to said unit;

detecting whether a SMART FAN mode of operation has been selected;

verifying that a minimum time period has elapsed since the last operation of said compressor ended;

verifying that a minimum time period has elapsed since the last change in speed of said fan motor;

operating said compressor based on a mode of operation detected, a demand for cooling indicated, an evaporator temperature verified, a power supply voltage measured, and a minimum time period since operation of said compressor verified; and operating said fan motor based on a mode of operation detected, a demand for cooling indicated, a power supply voltage measured, and a minimum time period since a last change in fan motor speed verified.

13. The method of claim 12, wherein operating said room air conditioner unit fan motor further comprises:

comparing said current ambient room temperature with said stored room temperature to determine if said ambient room temperature is increasing or decreasing; and operating said motor and said fan at a (a) first speed when said ambient temperature equals said temperature set point, or when said ambient temperature is increasing and said temperature difference is in a first incremental range;

(b) second speed when said ambient temperature is increasing and said temperature difference is in a second incremental range, or when said ambient temperature is decreasing and said temperature difference is in a third incremental range;

(c) third speed when said ambient temperature is increasing and said temperature difference is in a fourth incremental range, or when said ambient temperature is decreasing and said temperature difference is in a fifth incremental range; or (d) fourth speed when said ambient temperature is increasing and said temperature difference is in a sixth incremental range, or when said ambient temperature is decreasing and said temperature difference is in a seventh incremental range.

14. A room air conditioner unit having a compressor, an electric fan motor, a fan, a blower, an evaporator, a condenser, a controller, and a power supply, said controller comprising:

a TIMER switch pad for user selection of a timer mode of operation of said unit;

an on/off switch pad for user control of power to said unit;

a COOL switch pad for user selection of a cooling mode of operation of said unit;

a FAN ONLY switch pad for user selection of a fan only mode of operation of said unit;

a microprocessor;

a memory connected to said microprocessor;

means for entering and storing in said memory a desired temperature set point;

means for measuring and storing in said memory a current ambient room temperature;

means for calculating a temperature difference between said ambient room temperature and said temperature set point;

means for storing user-programmed operating parameters for said unit in said memory;

means for indicating a demand for cooling based on said temperature difference;

means for verifying the temperature of said evaporator;

a MONEY SAVER® switch pad for user selection of a money saver mode of operation of said unit;

means for measuring the voltage of said power supply applied to said unit;

a SMART FAN switch pad for user selection of a smart fan mode of operation of said unit;

means for verifying that a minimum time period has elapsed since the last operation of said compressor ended;

means for verifying that a minimum time period has elapsed since the last change in speed of said fan motor;

means for operating said compressor based on a mode of operation selected, a demand for cooling indicated, an evaporator temperature verified, a power supply voltage measured, and a minimum time period since operation of said compressor verified; and means for operating said fan motor based on a mode of operation detected, a demand for cooling indicated, a power supply voltage measured, and a minimum time period since a last change in fan motor speed verified.

15. The room air conditioner unit of Claim 14, wherein a component of said memory is non-volatile.

16. A method for controlling the speed of an air conditioner motor and fan comprising the steps of:

setting a desired temperature at a temperature set point;

measuring ambient room temperature;

calculating the temperature difference between said ambient temperature and said temperature set point;

operating said motor and said fan at a
- (a) first speed when said ambient temperature equals said temperature set point, or when said ambient temperature is increasing and said temperature difference is in a first incremental range;
- (b) second speed when said ambient temperature is increasing and said temperature difference is in a second incremental range, or when said ambient temperature is decreasing and said temperature difference is in a third incremental range;
- (c) third speed when said ambient temperature is increasing and said temperature difference is in a fourth incremental range, or when said ambient temperature is decreasing and said temperature difference is in a fifth incremental range; or
- (d) fourth speed when said ambient temperature is increasing and said temperature difference is in a sixth incremental range, or when said ambient temperature is decreasing and said temperature difference is in a seventh incremental range.

* * * * *